(12) United States Patent
Knowles et al.

(10) Patent No.: US 12,115,766 B2
(45) Date of Patent: Oct. 15, 2024

(54) METHODS FOR UNIFORM ADHESIVE BONDLINE CONTROL FOR 3D COLD FORMED CURVED LAMINATE

(71) Applicant: CORNING INCORPORATED, Corning, NY (US)

(72) Inventors: Peter Knowles, Elmira, NY (US); Arpita Mitra, Columbus, OH (US); Linda Frances Reynolds-Heffer, Horseheads, NY (US); Arlin Lee Weikel, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 283 days.

(21) Appl. No.: 17/290,938

(22) PCT Filed: Oct. 22, 2019

(86) PCT No.: PCT/US2019/057395
§ 371 (c)(1),
(2) Date: May 3, 2021

(87) PCT Pub. No.: WO2020/092060
PCT Pub. Date: May 7, 2020

(65) Prior Publication Data
US 2021/0370659 A1 Dec. 2, 2021

Related U.S. Application Data

(60) Provisional application No. 62/754,581, filed on Nov. 1, 2018.

(51) Int. Cl.
*B32B 37/00* (2006.01)
*B32B 7/14* (2006.01)
(Continued)

(52) U.S. Cl.
CPC ............ *B32B 37/1292* (2013.01); *B32B 7/14* (2013.01); *B32B 17/061* (2013.01);
(Continued)

(58) Field of Classification Search
CPC ..... B32B 37/1292; B32B 7/14; B32B 17/061; B32B 37/1207; B32B 37/144;
(Continued)

(56) References Cited

U.S. PATENT DOCUMENTS 2,480,642 A * 8/1949 Galloway ................. E04H 6/02
52/463
3,920,433 A 11/1975 Fogelberg et al.
(Continued)

FOREIGN PATENT DOCUMENTS

BE 1000350 A5 11/1988
CN 101678580 A 3/2010
(Continued)

OTHER PUBLICATIONS

English machine translation of FR 2526800 A1; Eckberg, Richard; 1983-11-18; C09D183/06; 117 pages. (Year: 1983).*
(Continued)

*Primary Examiner* — Linda L Gray
(74) *Attorney, Agent, or Firm* — William M. Johnson; Payal A. Patel

(57) ABSTRACT

Embodiments of this disclosure pertains to methods for controlling adhesive bondline while cold-bending a glass substrate. The method includes forming a frame to define a viewing area at least partially surrounded by the frame; shaping the frame to include at least one curvature; positioning a spacer proximate the frame, the spacer comprising: a border area; and a protrusion extending from the border area; engaging the border area of the spacer with the frame to insert the protrusion through the viewing area, wherein
(Continued)

the protrusion extends beyond the frame a first distance; positioning an adhesive between the frame and the glass substrate alongside the protrusion to control the bondline; engaging a glass substrate with the adhesive and the protrusion to cold form the glass substrate to the shape of the frame; and securing the glass substrate to the spacer to hold the frame against the adhesive to maintain the bondline.

9 Claims, 7 Drawing Sheets

(51) Int. Cl.
- *B32B 17/00* (2006.01)
- *B32B 17/06* (2006.01)
- *B32B 37/12* (2006.01)
- *B32B 37/14* (2006.01)
- *B32B 37/18* (2006.01)
- *B32B 38/00* (2006.01)
- *B32B 38/18* (2006.01)

(52) U.S. Cl.
CPC ........ *B32B 37/1207* (2013.01); *B32B 37/144* (2013.01); *B32B 37/18* (2013.01); *B32B 38/0008* (2013.01); *B32B 38/1866* (2013.01); *B32B 2307/412* (2013.01); *B32B 2315/08* (2013.01); *B32B 2457/20* (2013.01); *B32B 2605/003* (2013.01); *B32B 2605/08* (2013.01)

(58) Field of Classification Search
CPC ............... B32B 37/18; B32B 38/0008; B32B 2307/412; B32B 2315/08; B32B 2457/20; B32B 2605/003; B32B 2605/08
See application file for complete search history.

(56) References Cited

U.S. PATENT DOCUMENTS

| | | | |
|---|---|---|---|
| 4,455,338 A | 6/1984 | Henne | |
| 4,635,415 A * | 1/1987 | Schumacher | B29C 65/3444 156/927 |
| 4,899,507 A | 2/1990 | Mairlot | |
| 4,985,099 A | 1/1991 | Mertens et al. | |
| 6,086,983 A | 7/2000 | Yoshizawa | |
| 6,332,690 B1 | 12/2001 | Murofushi | |
| 6,582,799 B1 | 6/2003 | Brown et al. | |
| 7,375,782 B2 | 5/2008 | Yamazaki et al. | |
| 8,344,369 B2 | 1/2013 | Yamazaki et al. | |
| 8,549,885 B2 | 10/2013 | Dannoux et al. | |
| 8,833,106 B2 | 9/2014 | Dannoux et al. | |
| 8,912,447 B2 | 12/2014 | Leong et al. | |
| 9,061,934 B2 | 6/2015 | Bisson et al. | |
| 9,593,042 B2 | 3/2017 | Hu et al. | |
| 9,802,485 B2 | 10/2017 | Masuda et al. | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 10,131,118 B2 | 11/2018 | Kang et al. | |
| 2007/0223121 A1 | 9/2007 | Franck et al. | |
| 2009/0033859 A1 | 2/2009 | Ueda et al. | |
| 2009/0179840 A1 | 7/2009 | Tanaka et al. | |
| 2009/0185127 A1 | 7/2009 | Tanaka et al. | |
| 2010/0031590 A1 | 2/2010 | Buchwald et al. | |
| 2012/0202030 A1 | 8/2012 | Kondo et al. | |
| 2013/0088441 A1 | 4/2013 | Chung et al. | |
| 2015/0246507 A1 | 9/2015 | Brown et al. | |
| 2016/0297176 A1 | 10/2016 | Rickerl | |
| 2016/0306451 A1 | 10/2016 | Isoda et al. | |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0197561 A1 | 7/2017 | McFarland | |
| 2017/0327402 A1 | 11/2017 | Fujii et al. | |
| 2017/0349473 A1 | 12/2017 | Moriya et al. | |
| 2018/0037497 A1 | 2/2018 | Lee et al. | |
| 2018/0050948 A1 | 2/2018 | Faik et al. | |
| 2018/0111569 A1 | 4/2018 | Faik et al. | |
| 2018/0117881 A1 | 5/2018 | Pyles et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0188869 A1 | 7/2018 | Boggs et al. | |
| 2018/0210118 A1 | 7/2018 | Gollier et al. | |
| 2018/0245125 A1 | 8/2018 | Tsai et al. | |

FOREIGN PATENT DOCUMENTS

| | | | |
|---|---|---|---|
| CN | 101684032 A | 3/2010 | |
| CN | 102566841 A | 7/2012 | |
| CN | 203825589 U | 9/2014 | |
| CN | 104679341 A | 6/2015 | |
| CN | 204463066 U | 7/2015 | |
| CN | 104843976 A | 8/2015 | |
| CN | 105511127 A | 4/2016 | |
| CN | 107757516 A | 3/2018 | |
| CN | 108025939 A | 5/2018 | |
| CN | 108032595 A | 5/2018 | |
| DE | 4415878 A1 | 11/1995 | |
| DE | 102004022008 A1 | 12/2004 | |
| DE | 102013214108 A1 | 2/2015 | |
| EP | 2872326 A1 | 5/2015 | |
| EP | 3302968 A1 | 4/2018 | |
| FR | 2138711 A1 * | 1/1973 | ............... E04C 2/38 |
| FR | 2918411 A1 | 1/2009 | |
| GB | 2011316 A | 7/1979 | |
| JP | 11-060293 A | 3/1999 | |
| JP | 3059337 B2 | 7/2000 | |
| JP | 2003-500260 A | 1/2003 | |
| JP | 2003-321257 A | 11/2003 | |
| JP | 2004-284839 A | 10/2004 | |
| JP | 2013-084269 A | 5/2013 | |
| JP | 2013-188993 A | 9/2013 | |
| JP | 2015-092422 A | 5/2015 | |
| JP | 5748082 B2 | 7/2015 | |
| JP | 2016-031696 A | 3/2016 | |
| JP | 5976561 B2 | 8/2016 | |
| JP | 2016-173794 A | 9/2016 | |
| JP | 2016-203609 A | 12/2016 | |
| JP | 2016-207200 A | 12/2016 | |
| KR | 10-2016-0144008 A | 12/2016 | |
| WO | 98/01649 A1 | 1/1998 | |
| WO | 2000/073062 A1 | 12/2000 | |
| WO | 2007/108861 A1 | 9/2007 | |
| WO | 2008/013647 A2 | 1/2008 | |
| WO | 2009/014577 A1 | 1/2009 | |
| WO | 2012/058084 A2 | 5/2012 | |
| WO | 2014/011334 A1 | 1/2014 | |
| WO | 2014/085078 A1 | 6/2014 | |
| WO | 2014/175371 A1 | 10/2014 | |
| WO | 2015/031594 A2 | 3/2015 | |
| WO | 2016/044360 A1 | 3/2016 | |
| WO | 2016/125713 A1 | 8/2016 | |
| WO | 2016/136758 A1 | 9/2016 | |
| WO | 2016/196531 A1 | 12/2016 | |
| WO | 2016/196546 A1 | 12/2016 | |
| WO | 2017/019851 A1 | 2/2017 | |
| WO | 2017/155932 A1 | 9/2017 | |
| WO | 2018/005646 A1 | 1/2018 | |
| WO | 2018/009504 A1 | 1/2018 | |
| WO | 2018/075853 A1 | 4/2018 | |
| WO | 2018/081068 A1 | 5/2018 | |
| WO | 2018/125683 A1 | 7/2018 | |
| WO | 2018/129065 A2 | 7/2018 | |

OTHER PUBLICATIONS

International Search Report and Written Opinion of the International Searching Authority; PCT/US2019/057395; dated Feb. 6, 2020; 7 pages; European Patent Office.

(56) References Cited

OTHER PUBLICATIONS

International Search Report and Written Opinion of the International Searching Authority; PCT/US2018/012215 Dated Aug. 1, 2018; 21 Pgs; European Patent Office.
International Search Report and Written Opinion of the International Searching Authority; PCT/US2018/041062 Dated Nov. 13, 2018; 15 Pgs; European Patent Office.
Invitation to Pay Additional Fees of the International Searching Authority; PCT/US2018/012215; Mailed May 11, 2018; 13 Pages; European Patent Office.
Jan Belis, Bart Inghelbrecht, Rudy Van Impe and Dieter Callewaert, "Cold bending of laminated glass panels", Heron, 2007, 52, pp. 123-146.
Kyriaki G. Datsiou and Mauro Overend, "Behaviour of cold bent glass plates during the shaping process", Engineered Transparency. International Conference at glasstec, Dusseldorf, Germany, Oct. 21-22, 2014, 10 pages.
Laura Galuppi and Gianni Royer-Carfagni, "Optimal cold bending of laminated glass", International Journal of Solids and Structures, 2015, 67-68, pp. 231-243.
Chinese Patent Application No. 201980080562.2, Office Action dated Oct. 17, 2022, 4 pages (English translation only), Chinese Patent Office.

\* cited by examiner

METHODS FOR UNIFORM ADHESIVE BONDLINE CONTROL FOR 3D COLD FORMED CURVED LAMINATE

CROSS-REFERENCE TO RELATED APPLICATIONS

This application is a national stage application under 35 U.S.C. § 371 of International Application No. PCT/US2019/057395, filed on Oct. 22, 2019, which claims the benefit of priority under 35 U.S.C. § 119 of U.S. Provisional Application Ser. No. 62/754,581 filed on Nov. 1, 2018 the content of which is relied upon and incorporated herein by reference in its entirety.

BACKGROUND

Embodiments of this disclosure pertain to methods for uniform adhesive bondline control and in particular, to methods for uniform adhesive bondline control for forming cold-formed cover glass and cover glass and frame laminates.

The present invention relates generally to the field of automotive interiors, and more particularly to 3D non-display areas in the vehicle. The invention is enabled by use of cold bent glass that is held in shape using a structural adhesive. The resultant product provides more appeal, higher reliability and improved safety to consumers, and opens design space for interior automotive designers.

There is an ever-growing need and consumer thirst for technological innovation in the global automotive interiors industry. Vehicle manufactures are creating interiors that better connect, provide appeal, protect and safely inform today's drivers and passengers. There is already a trend towards larger displays including touch functionality in the new models from several OEMs. However, most of these displays consist of flat or two-dimensional (2D) plastic cover lenses. More recently, plastic is replaced by glass due to the superior functionality and user experience that glass materials provide.

With growing interests from customers, and to maintain market positions the automotive industry is expected to move to three-dimensional (3D) surfaces made from glass. These 3D surfaces are expected to include both display and non-display area in the vehicle interior.

Three-dimensional glass surfaces are conventionally formed via hot forming process. The process also is capable for forming curved 3D automotive interior displays. However, the process is energy intensive due to the high temperatures involved and adds significant cost to such products. Furthermore, there is a need to provide anti-reflection coatings on automotive interior display surfaces. Providing such coatings uniformly on a 3D surface utilizing known techniques is very challenging and also adds to the cost of the process.

To address these issues, there is a need for cover glass for automotive interior applications that is curved using cold-bending techniques.

One of the challenges with cold-bent glass is the extent to which it can be safely bent and installed in a vehicle. With the interior designers requiring tight curvatures, there is a need to develop a solution to safely implement glass in automotive interiors. The cold bending process imparts bending stress and changes the central tension in the glass. Further, the coefficient thermal expansion (CTE) of some cover glasses (e.g., aluminosilicate glasses) is about $7.88 \times 10^{-6}/°$ C., which is lower than the CTE of commonly used frame materials that are used to maintain the cold-bent shape of the glass. Such frame materials include Polycarbonate/Acrylonitrile Butadiene Styrene (PC/ABS) (with a CTE of about 70 to about $90 \times 10^{-6}/°$ C.), Magnesium-alloys (with a CTE of about $25.2 \times 10^{-6}/°$ C. to about $27.1 \times 10^{-6}/°$ C.), Aluminum-alloys (with a CTE of about $20.4 \times 10^{-6}/°$ C. to about $24.7 \times 10^{-6}/°$ C.), stainless steel (with a CTE of about $12 \times 10^{-6}/°$ C. to about $19.4 \times 10^{-6}/°$ C.). This causes a CTE-mismatch induced stress which can be 5 times to about 100 times higher than cold bend stress of the glass depending on the viscoelastic or hyperelastic properties of the adhesive and the choice of the frame material. For the adhesive to have good tensile and shear load bearing capability and be able to accommodate the CTE-mismatch between adherends over $-45°$ C. to $100°$ C. service temperature range, a two-component adhesive system with a minimum adhesive width of 3 mm and a minimum adhesive height of 0.3 mm is needed. The structural adhesives would typically be either an epoxy, polyurethane, silicone or silane modified polymer. These structural adhesives have high viscosity in the range of 20,000-600,000 cP and being in a liquid or paste consistency must be held in a uniform bondline at least till the handling strength of the adhesive is reached. Typically, in the industry, hollow or filled glass microbeads/microspacers or metal/plastic shims are used to maintain uniform bondline control. However, in 3D cold-bent laminate (including cover glass and a frame), as glass is one of the adherends, the use of glass microbeads or other hard material in the adhesive bondline results in micro-level scratches which affect the frangibility of a glass laminate.

SUMMARY

Embodiments of this disclosure pertain to methods for controlling the adhesive bondline (width and height of the adhesive) control in a 3D curved laminate formed by cold bending a cover material (which can include glass such as soda lime, aluminosilicate, borosilicate, alkaline earth boro-aluminosilicate glasses, or polymeric materials such as polyimide, polymethyl methacrylate, polycarbonate etc.). and bonding it to a curved frame (which can include a metal or plastic such as PC/ABS, polypropylene (PP)/ethylene-propylene-diene (EPDM) (PP-EPDM), carbon fiber reinforced plastic, glass reinforced plastic, etc.). One method for achieving this uniform adhesive bondline control is the use of a spacer. An alternative method utilizes applying a uniform cured adhesive bead.

In one or more embodiments, the spacer may include Teflon®, polypropylene (PP), polyethylene (PE) or other non-stick coated metals, etc. In one or more embodiments, the spacer is inserted from a vehicle mounting side of the frame into an opening of the frame (which may include a display) and is temporarily attached to the frame using a fastener (e.g., screws, for example). The height of the spacer is greater than the frame so that it protrudes above the frame surface and acts as a physical stop that maintains the cover material at a specified distance off the frame surface and thus, helps control a uniform bondline height. In one or more embodiments, the method includes positioning an adhesive between the frame and the cover material alongside the raised spacer to control the bond line. In one or more embodiments, the width of the adhesive bondline is controlled as the adhesive path remains between the outside edge of the spacer and the edge of the cover material in the laminate. The method includes engaging the cover material with the adhesive and the spacer to cold-bend the cover material to the shape of the curved frame to form the cover material-frame laminate. After the adhesive is cured, the method includes removing the spacer from the cover material-frame laminate. In one or more embodiments, the method includes laminating a display to the cover material after the spacer is inserted in the opening of the frame, or after the spacer is removed from the laminate.

A second aspect of the method includes laminating a display to a cover material in a flat configuration lamination on the flat cover glass and then cold-bending the cover material to the curved frame. In one or more embodiments, the lamination before cold-bending means there is no opening available for spacer. Accordingly, in one or more embodiments adhesive is dispensed in the form of an adhesive bead, as a line (formed by single pass or multiple passes to achieve desired height) or dots or other patterns. The adhesive bead is formed along the perimeter of the display area and on the regions to be curved by cold-bending. The adhesive bead is then cured using UV or thermal means to form a cured adhesive bead. The cured adhesive bead acts as a height control and determines the height of the structural adhesive in the curved cover glass-frame laminate. Different adhesive materials such as epoxy, polyurethane, acrylates and silicones can be used to form the adhesive bead. The height of the adhesive bead determines the final adhesive bondline height in the 3D curved laminate. The uniform width of the adhesive bondline is achieved through dispensing the right volumetric amount of the structural adhesive for the given adhesive bezel width.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
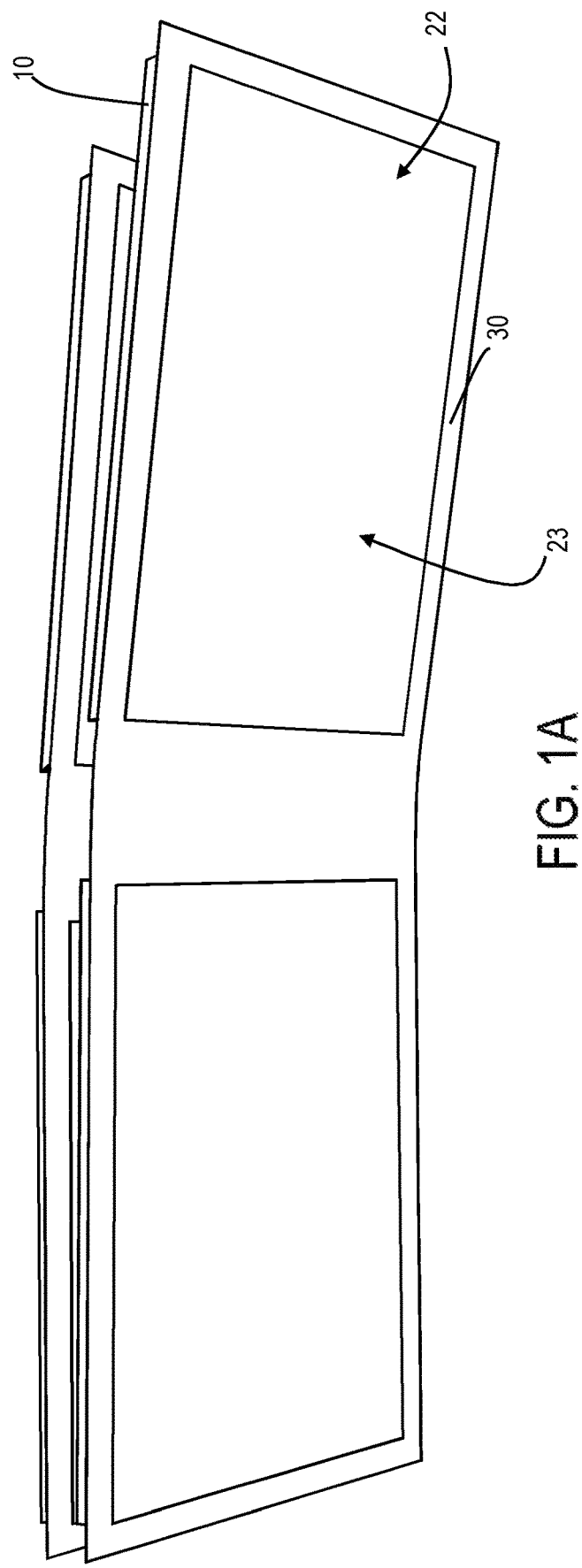
FIGS. 1A, B and C are front, back and side views of the spacers inserted in an opening of a frame, according to one or more embodiments.

Reference will now be made in detail to various embodiments.

In the proposed disclosure, two approaches have been identified to achieve a uniform adhesive bondline control in a 3D cold formed curved laminate. The $1^{st}$ approach, as shown in FIGS. 1A-3, includes using spacer(s), more specifically, a spacer 10 is inserted from the vehicle mounting side of the frame 20 into the display window opening 22 of the frame 20 (defining a viewing area 23) and is temporarily attached to the frame 20 using easy-to-remove screws 24 to form a frame-spacer assembly 40. As shown in FIGS. 1B and 1C, the spacer includes a border area 26 and a protrusion 28 extending from the border area 26. The border area 26 engages with the frame 20 such that the protrusion 28 is inserted through the display window opening 22. The protrusion 28 extends beyond the frame 20 by a height 29. Adhesive is applied either onto the curved frame 20 or the flat cover glass (CG) 30 using an adhesive dispenser (manual or pneumatic dispensing applicator or robotic dispensing equipment) to form an adhesive bondline having a width. In embodiments, the CG 30 is placed on a vacuum chuck (not depicted) and the frame-Teflon® spacer assembly is aligned onto the CG. The height 29 of the Teflon® insert above the frame surface acts as a physical stop as it keeps the CG a specified distance off the frame surface. A negative (or inverse) chuck with a flat plate bolted on top holds the entire laminate together. This assembly is held in place under vacuum till the handling strength of the adhesive (minutes to few hours duration depending on the adhesive) is reached. The width of the adhesive bondline is controlled by the spacer 10, as the adhesive path remains between the edge of the CG 30 in the laminate and the outside edge of the protrusion 28 of the Teflon® insert spacer 10. Thus, the Teflon® insert helps control a uniform bondline (width and height) and the Teflon® spacer is removed after the adhesive is cured. It is advisable to keep the curved laminate clamped till full-cure of the adhesive (hours to days duration depending on the adhesive) is reached.

Figure 3:
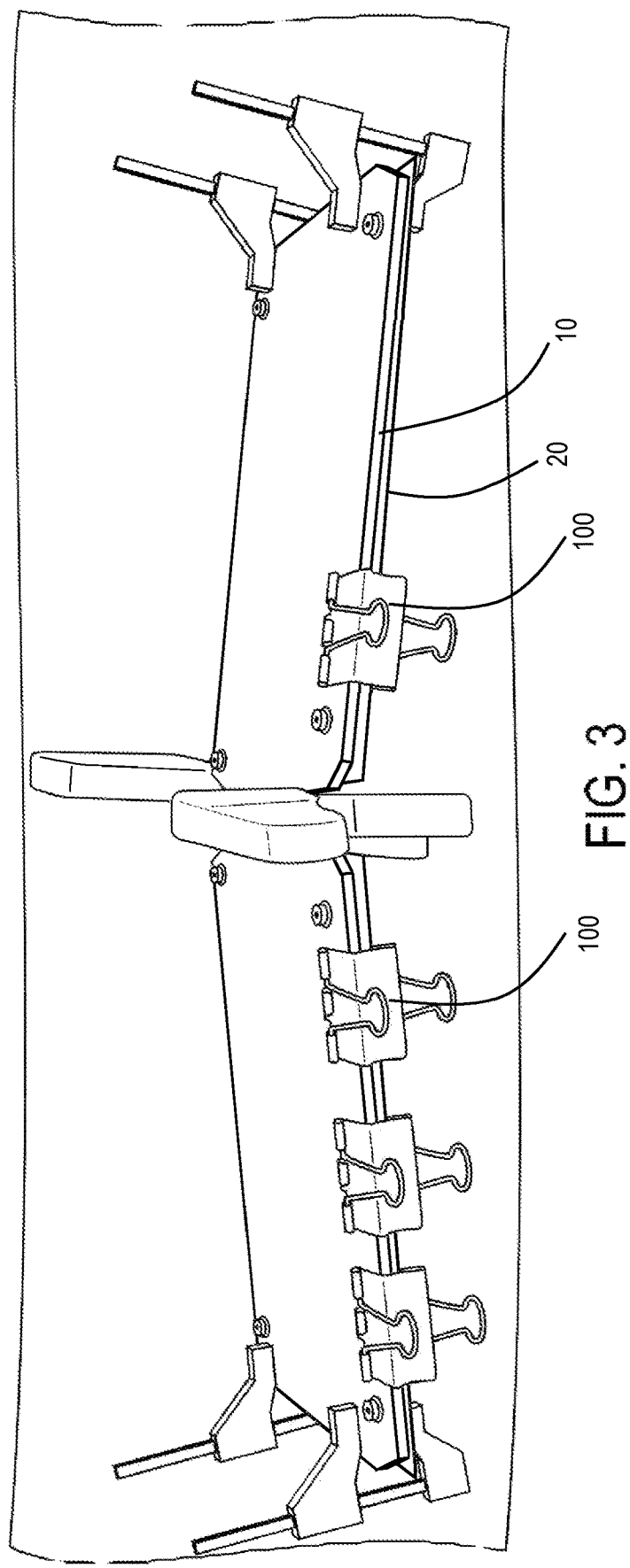
FIG. 3 is the part of FIG. 2 after clamping.

An alternative process can be considered for increased throughput: Teflon® spacer is inserted from the vehicle mounting side of the frame into the display window opening of the frame and is temporarily attached to the frame using easy-to-remove screws. The height of the Teflon® insert above the frame surface acts as a physical stop as it keeps the CG a specified distance off the frame surface. Teflon® guides are attached to the frame corners to assist with the alignment of the CG to the frame in the laminate. After the CG has been aligned to frame-Teflon® spacer assembly, an inverse frame (made of Teflon®, plastic or non-stick coated metal) is placed on top of the CG and the entire assembly is clamped together. For example, FIG. 3 shows clamps 100 that are used to mechanically secure the CG (not depicted in FIG. 3) to the spacer 10 to hold the frame 10 against adhesive (not depicted in FIG. 3) and form a bondline.

In another variation: Instead of the inverse frame, a sectioned-frame approach is used. Here, Curved clamp plate with flat ends (made of Teflon, plastic or non-stick coated metal) is placed over the curved region(s) of the CG surface. This Curved clamp plate, designed to account for the adhesive height and bend radius at the curvature, applies uniformly distributed downward pressure and helps prevent any adhesive non-uniformity in the curved region(s) of the laminate. The Curved clamp plate can be secured to the frame along the edge using clamps. Further, to minimize any adhesive distortion over the flat display area of the CG, a flat 1-7 mm sheet/thin plate (made of Teflon®, plastic or non-stick coated metal) can be placed which is then be secured to the frame along the edge using clamps. In yet another variation, instead of the flat sheet or thin plate, channels (made of Teflon®, plastic or non-stick coated metal) can be placed along the side/edges of the display window to clamp the flat display surface to the frame.

The above processes produce higher throughput as it does not limit the number of parts made using the vacuum chuck. The clamps are kept on till full-cure of the adhesive (hours to days duration depending on the adhesive) is reached.

Figure 1B:
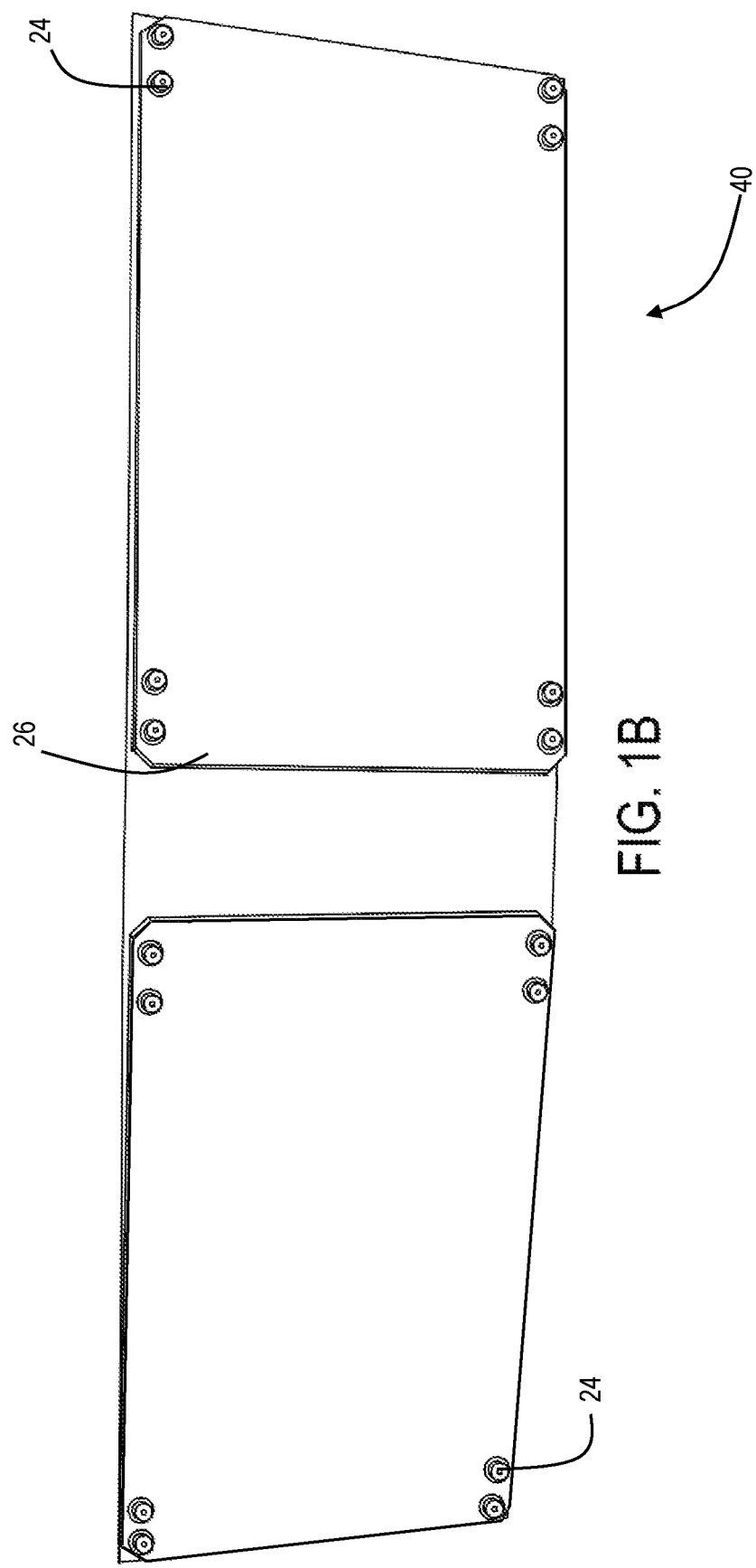
Figure 1C:
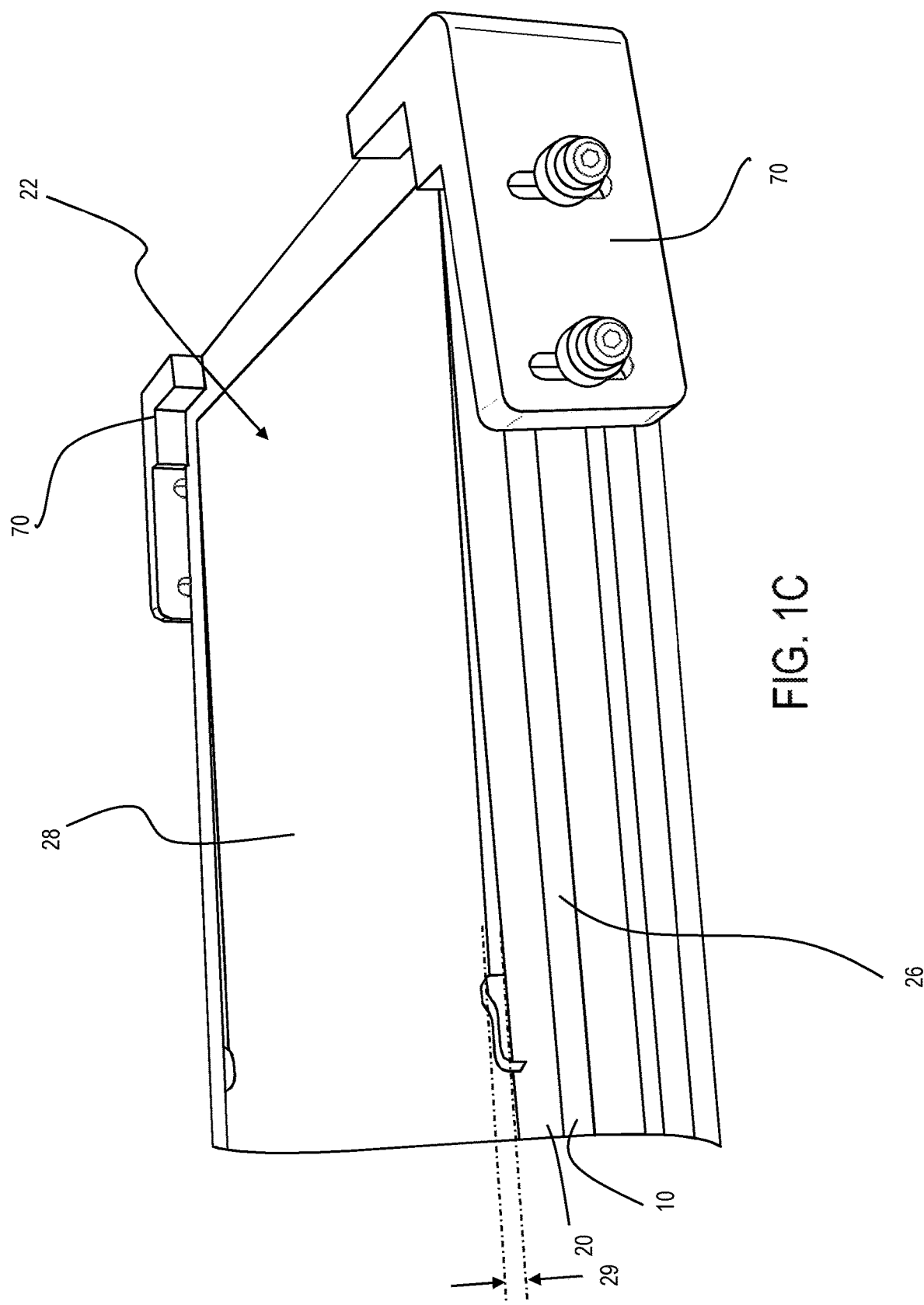

FIGS. 1A, B and C are front, back and side views of the spacers inserted in an opening of a frame. In FIG. 1C, the alignment guides to align the cover glass CG on top of the frame is shown.

Figure 2:
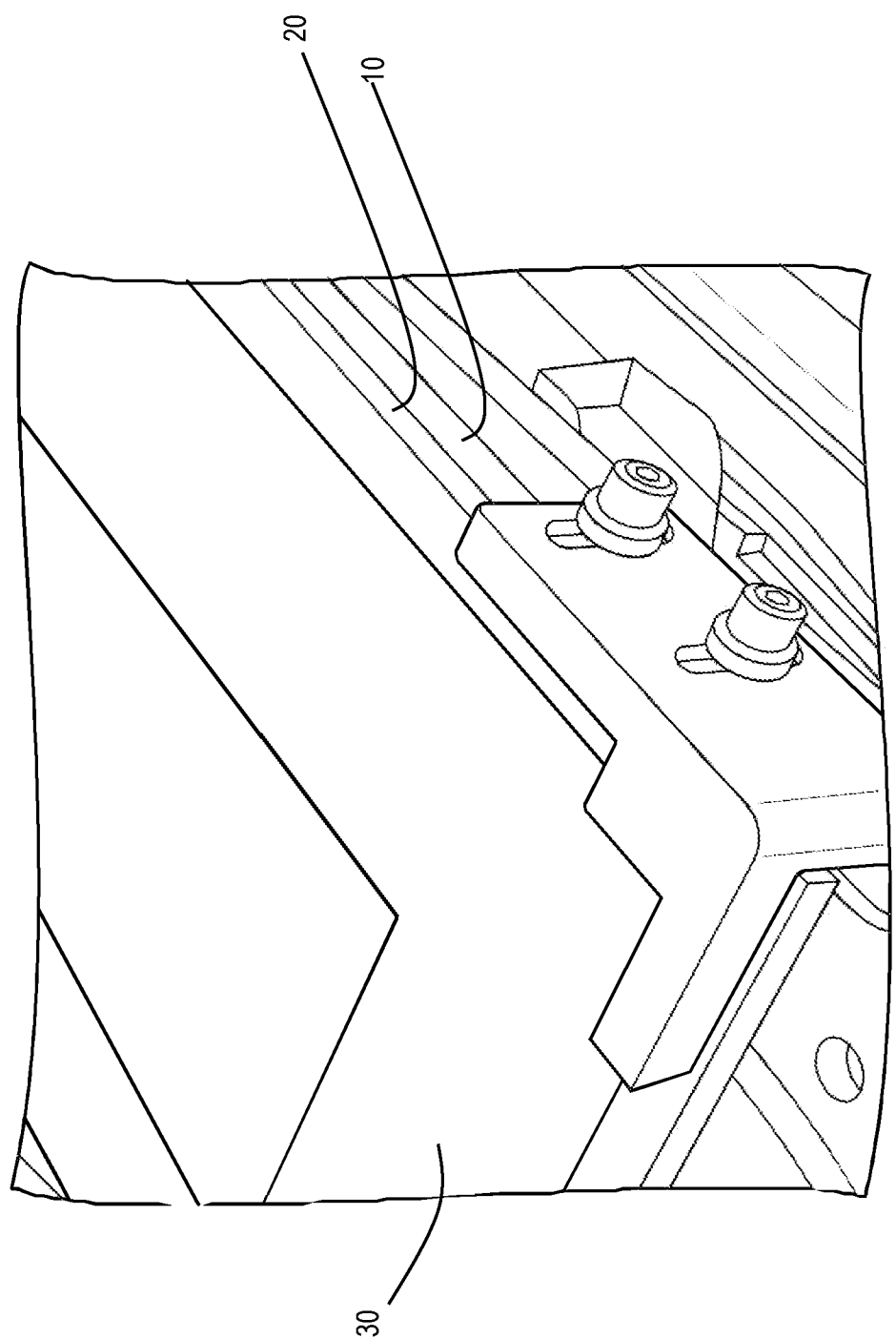
FIG. 2 is a part with Teflon® spacers, guides, and glass bonded to frame before clamping, according to one or more embodiments.

FIG. 2 shows a spacer 20, guides 70, and CG 30 bonded to frame 20 before clamping.

FIG. 3 shows the spacer, guides and glass bonded to the frame after clamping.

The 1$^{st}$ uniform bondline approach requires that the display lamination process is done after the cold-bending process as the spacer is inserted in the display window opening of the frame.

Figure 5:
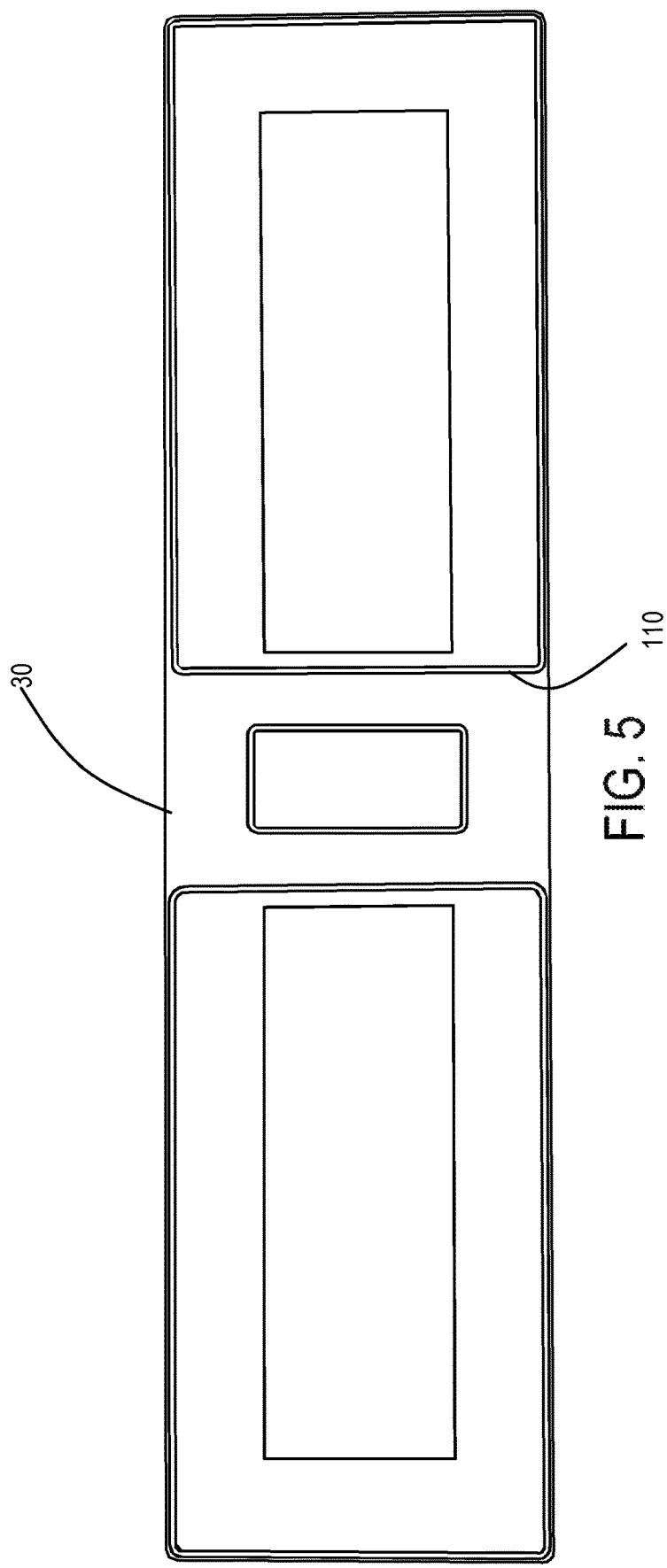
FIG. 5 shows a cover material with a I mm adhesive bead dispensed along the periphery of the part and in the central region for adhesive, according to one or more embodiments.

When the display is laminated to the cover material, there is no opening accessible. Accordingly, in such embodiments, the different approach is needed to achieve a uniform bondline control. In one or more embodiments, in the 2nd approach, using a robotic dispenser a precise adhesive volume is laid down in the form of an adhesive bead 100 (see FIG. 5) along the perimeter of the display window area as well as in the curved region(s). FIG. 5 shows the adhesive bead 100 disposed on the CG 30 as a gap controlling material. The adhesive bead 100 is then cured using UV or thermal means to form a cured adhesive bead. The cured adhesive bead acts as a height control and determines the height of the structural adhesive in the 3D Cold formed curve laminate. The adhesive used for the adhesive bead must be chemically compatible with the structural adhesive. The adhesive bead 100 can be laid down either on the flat CG or on the curved frame. Structural adhesive is dispensed onto either the flat GG or curved frame and the flat GG is then cold bent to the curved frame using either clamping or a chuck, as described herein. The height of the adhesive bead determines the final adhesive bondline height in the 3D curved laminate. The uniform width of the adhesive bondline is achieved through dispensing the right volumetric amount of the structural adhesive for the given adhesive bezel width. Different adhesive materials such as Epoxy, Polyurethane, Acrylates, Silane Modified Polymers or Silicones can be used to form the adhesive bead. This adhesive bead method is already used for display lamination method, but what makes it unique in the 3D Cold bending process that the structural adhesive bezel width in 3D Cold formed laminate is very narrow, typically 5-10 mm. Hence, very precise control of the adhesive bead is needed with minimum bead width being 1 mm.

Figure 4:
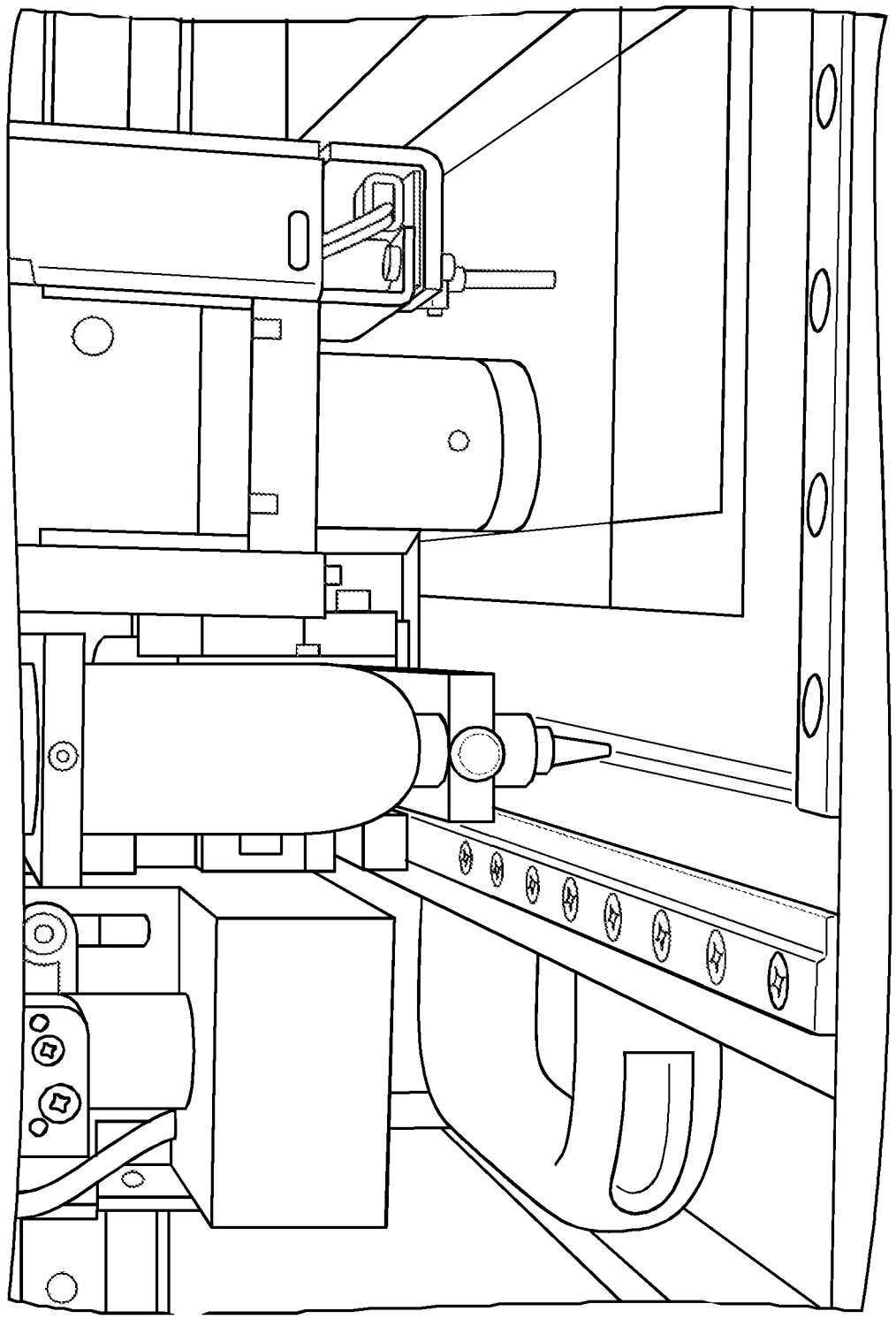
FIG. 4 shows an adhesive bead being dispensed by Robotic adhesive dispenser, according to one or more embodiments.

FIG. 4 shows the robotic adhesive dispenser. FIG. 5 shows the cover material with a 1 mm adhesive bead dispensed along the periphery of the part and in the central region for adhesive.

Aspect (1) of this disclosure pertains to a method for controlling adhesive bondline while cold forming a curved decorated or non-decorated glass substrate, the method comprising: forming a frame to define a viewing area at least partially surrounded by the frame; shaping the frame to include at least one curvature; positioning a spacer proximate the frame, the spacer comprising: a border area; and a protrusion extending from the border area; engaging the border area of the spacer with the frame to insert the protrusion through the viewing area, wherein the protrusion extends beyond the frame a first distance; positioning an adhesive between the frame and the decorated or non-decorated glass substrate alongside the protrusion to control the bondline; engaging a decorated or non-decorated glass substrate with the adhesive and the protrusion to cold form the glass substrate to the shape of the frame; and one or both of vacuum forming and mechanically securing the decorated or non-decorated glass substrate to the spacer to hold the frame against the adhesive to maintain the bondline.

Aspect (2) of this disclosure pertains to the method of Aspect (1), further comprising maintaining the first distance constant across the at least one curvature and the border area using the protrusion.

Aspect (3) of this disclosure pertains to the method of Aspect (1) or Aspect (2), further comprising maintaining a width of the adhesive constant along the border area by engaging the frame with the protrusion along the viewing area.

Aspect (4) of this disclosure pertains to the method of any one of Aspects (1) through (3), further comprising detachably coupling a spacer to the frame.

Aspect (5) of this disclosure pertains to the method of Aspect (4), wherein detachably coupling the spacer to the frame comprises coupling the spacer to the frame with removable fasteners.

Aspect (6) of this disclosure pertains to the method of any one of Aspects (1) through (5), wherein mechanically securing the glass substrate to the spacer comprises mechanically securing the glass substrate to the spacer by one or both of vacuum forming and mechanical clamping, in which as an example, further comprises positioning a backing layer against the decorated or non-decorated glass substrate opposite the spacer.

Aspect (7) of this disclosure pertains to the method of Aspect (6), wherein the backing layer comprises an inverse frame having an inverse shape of the frame.

Aspect (8) of this disclosure pertains to the method of Aspect (7), wherein the inverse frame comprises a plurality of pieces.

Aspect (9) of this disclosure pertains to the method of Aspect (8), wherein at least one of the plurality of pieces has a shape including an inverse of the at least one curvature.

Aspect (10) of this disclosure pertains to the method of Aspect (8) or Aspect (9), wherein at least one of the plurality of pieces covers the viewing area.

Aspect (11) of this disclosure pertains to the method of any one of Aspects (6) through (10), wherein the backing layer comprises a non-stick material.

Aspect (12) of this disclosure pertains to the method of any one of Aspects (6) through (11), wherein mechanically securing the decorated or non-decorated glass substrate to the spacer comprises clamping together the spacer and the backing layer.

Aspect (13) of this disclosure pertains to the method of any one of Aspects (6) through (12), wherein mechanically securing the decorated or non-decorated glass substrate to the frame comprises clamping together the frame and the glass substrate without a backing layer.

Aspect (14) of this disclosure pertains to the method of any one of Aspects (6) through (13), further comprising attaching guides to corners of the frame to align the decorated or non-decorated glass to the frame.

Aspect (15) of this disclosure pertains to the method of any one of Aspects (1) through (14), wherein the spacer is formed of a non-stick material.

Aspect (16) of this disclosure pertains to the method of any one of Aspects (1) through (15), wherein the frame is formed of a metal and the glass substrate is formed of soda lime glass, aluminosilicate glass, borosilicate glass, boroaluminosilicate glass, alkali-containing aluminosilicate glass, alkali-containing borosilicate glass, alkali-containing boroaluminosilicate glass, polycarbonate, polyimide or acrylics.

Aspect (17) of this disclosure pertains to the method of any one of Aspects (1) through (16), wherein the adhesive is applied to the decorated or non-decorated glass substrate prior to engaging the decorated or non-decorated glass substrate with the protrusion of the spacer.

Aspect (18) of this disclosure pertains to the method of any one of Aspects (1) through (17), wherein the adhesive is applied to the frame prior to engaging the decorated or non-decorated glass substrate with the protrusion of the spacer.

Aspect (19) of this disclosure pertains to the method of any one of Aspects (1) through (18), further comprising priming the decorated or non-decorated glass at a point before the engaging.

Aspect (20) of this disclosure pertains to the method of any one of Aspects (1) through (19), further comprising applying the adhesive manually or with a robot.

Aspect (21) of this disclosure pertains to the method of any one of Aspects (1) through (20), further comprising: curing the adhesive, optionally to cold form the curved glass laminate; and removing the spacer from the frame.

Aspect (22) of this disclosure pertains to the method of Aspect (21), further comprising curing the adhesive either at RT, with actinic radiation or by thermal means.

Aspect (23) of this disclosure pertains to a method for controlling adhesive bondline while cold forming a curved decorated or non-decorated glass substrate, the method comprising: forming a frame to define a viewing area at least partially surrounded by the frame; shaping the frame to include at least one curvature; positioning a glass substrate proximate the frame; applying a spacer or gap controlling material along a perimeter of the glass substrate or a perimeter of the frame, the spacer or gap controlling material having a first height; positioning a structural adhesive between frame and the glass substrate such that the spacer or gap controlling material controls the bondline; engaging the glass substrate, the frame and the spacer or gap controlling material to cold form the glass substrate to the shape of the frame; and one or both of vacuum forming and mechanically securing the glass substrate to the frame to hold the frame against the structural adhesive to maintain the bondline.

Aspect (24) of this disclosure pertains to the method of Aspect (23), wherein in one embodiment the spacer or gap controlling material is a curable adhesive bead.

Aspect (25) of this disclosure pertains to the method of Aspect (23) or Aspect (24), further comprising maintaining the first distance constant across the at least one curvature and the viewing area using the adhesive bead.

Aspect (26) of this disclosure pertains to the method of any one of Aspects (23) through (25), wherein mechanically securing the glass substrate to the frame comprises mechanically securing the glass substrate to the frame by one or both of vacuum forming and mechanical Aspect (27) of this disclosure pertains to the method of any one of Aspects (23) through (26), wherein the backing layer comprises an inverse frame having an inverse shape of the frame.

Aspect (28) of this disclosure pertains to the method of any one of Aspects (23) through (27), wherein the backing layer comprises a non-stick material.

Aspect (29) of this disclosure pertains to the method of any one of Aspects (23) through (28), wherein mechanically securing the decorated or non-decorated glass substrate to the frame comprises clamping together the frame and the backing layer.

Aspect (30) of this disclosure pertains to the method of any one of Aspects (23) through (29), wherein mechanically securing the decorated or non-decorated glass substrate to the frame comprises clamping together the frame and the glass substrate without a backing layer.

Aspect (31) of this disclosure pertains to the method of any one of Aspects (23) through (30), wherein the frame is formed of a metal and the glass substrate is formed of soda lime glass, aluminosilicate glass, borosilicate glass, boroaluminosilicate glass, alkali-containing aluminosilicate glass, alkali-containing borosilicate glass, alkali-containing boroaluminosilicate glass, polycarbonate, polyimide or acrylic.

Aspect (32) of this disclosure pertains to the method of any one of Aspects (23) through (31), wherein the curable spacer material is applied to the frame.

Aspect (33) of this disclosure pertains to the method of any one of Aspects (23) through (32), wherein the curable spacer material is applied to the decorated or non-decorated glass substrate.

Aspect (34) of this disclosure pertains to the method of any one of Aspects (23) through (33), wherein the structural adhesive is applied to the frame.

Aspect (35) of this disclosure pertains to the method of any one of Aspects (23) through (34), wherein the structural adhesive is applied to the decorated or non-decorated glass substrate.

Aspect (36) of this disclosure pertains to the method of any one of Aspects (23) through (35), further comprising priming the decorated or non-decorated glass at a point before the engaging.

Aspect (37) of this disclosure pertains to the method of any one of Aspects (23) through (36), further comprising applying the adhesive bead with a robot.

Aspect (38) of this disclosure pertains to the method of any one of Aspects (23) through (37), further comprising controlling a height of the adhesive bead by controlling volumetric flow of adhesive.

Aspect (39) of this disclosure pertains to the method of any one of Aspects (23) through (38), wherein the structural adhesive is chemically compatible with the spacer or gap controlling material.

Aspect (40) of this disclosure pertains to the method of any one of Aspects (23) through (39), wherein the curable spacer material comprises an epoxy, a polyurethane, an acrylate, a silane modified polymer or a silicone, and the structural adhesive comprises an epoxy, a polyurethane, an acrylate, a silane modified polymer or a silicone.

Aspect (41) of this disclosure pertains to the method of any one of Aspects (23) through (40), wherein the spacer or gap controlling material is segmented.

Aspect (42) of this disclosure pertains to the method of any one of Aspects (23) through (41), wherein the spacer or gap controlling material is continuous.

Aspect (43) of this disclosure pertains to the method of any one of Aspects (23) through (42), wherein the spacer or gap controlling material is multilayered.

Aspect (44) of this disclosure pertains to the method of any one of Aspects (23) through (42), further comprising curing the structural adhesive.

Aspect (45) of this disclosure pertains to the method of Aspect (44), further comprising curing the structural adhesive to cold form the curved glass laminate.

Aspect (46) of this disclosure pertains to the method of Aspect (45), wherein the structural adhesive is either cured at room temperature, with actinic radiation or by thermal means.

It will be apparent to those skilled in the art that various modifications and variations can be made without departing from the spirit or scope of the invention.

What is claimed is:

1. A method for controlling an adhesive bondline while cold forming a curved decorated or non-decorated glass substrate, the method comprising:
    positioning a glass substrate proximate a frame comprising a viewing area at least partially surrounded by the frame and at least one curvature;
    applying a spacer or gap controlling material along a perimeter of the glass substrate or a perimeter of the frame, the spacer or gap controlling material having a first height;
    positioning a structural adhesive between the frame and the glass substrate to form the adhesive bondline;
    engaging the glass substrate, the frame and the spacer or gap controlling material to cold form the glass substrate to the shape of the frame; and
    one or both of vacuum forming and mechanically securing the glass substrate to the frame to hold the frame against the structural adhesive such that the spacer or gap controlling material controls a height and a width of the adhesive bondline formed by the structural adhesive to maintain the adhesive bondline.

2. The method of claim 1, wherein the spacer or gap controlling material is a curable adhesive bead.

3. The method of claim 2, further comprising maintaining the first height constant across the at least one curvature and the viewing area using the adhesive bead.

4. The method of claim 1, wherein the glass substrate is mechanically secured to the frame to hold the frame against the structural adhesive, wherein the mechanically securing the glass substrate to the frame comprises mechanical clamping.

5. The method of claim 1, wherein the gap controlling material is applied to the frame or the glass substrate.

6. The method of claim 1, wherein the structural adhesive is applied to the frame or the glass substrate.

7. The method of claim 1, wherein the gap controlling material comprises an epoxy, a polyurethane, an acrylate, a silane modified polymer or a silicone, and the structural adhesive comprises an epoxy, a polyurethane, an acrylate, a silane modified polymer or a silicone.

8. The method of claim 1, wherein the spacer or gap controlling material is segmented or continuous.

9. The method of claim 1, wherein the structural adhesive bonds the glass substrate to the frame to cold form the glass substrate.

* * * * *